Dec. 27, 1966 R. J. ROWEKAMP 3,293,872
LADDER-TYPE TRAYS FOR DESALTING SEA WATER
Filed Feb. 28, 1966
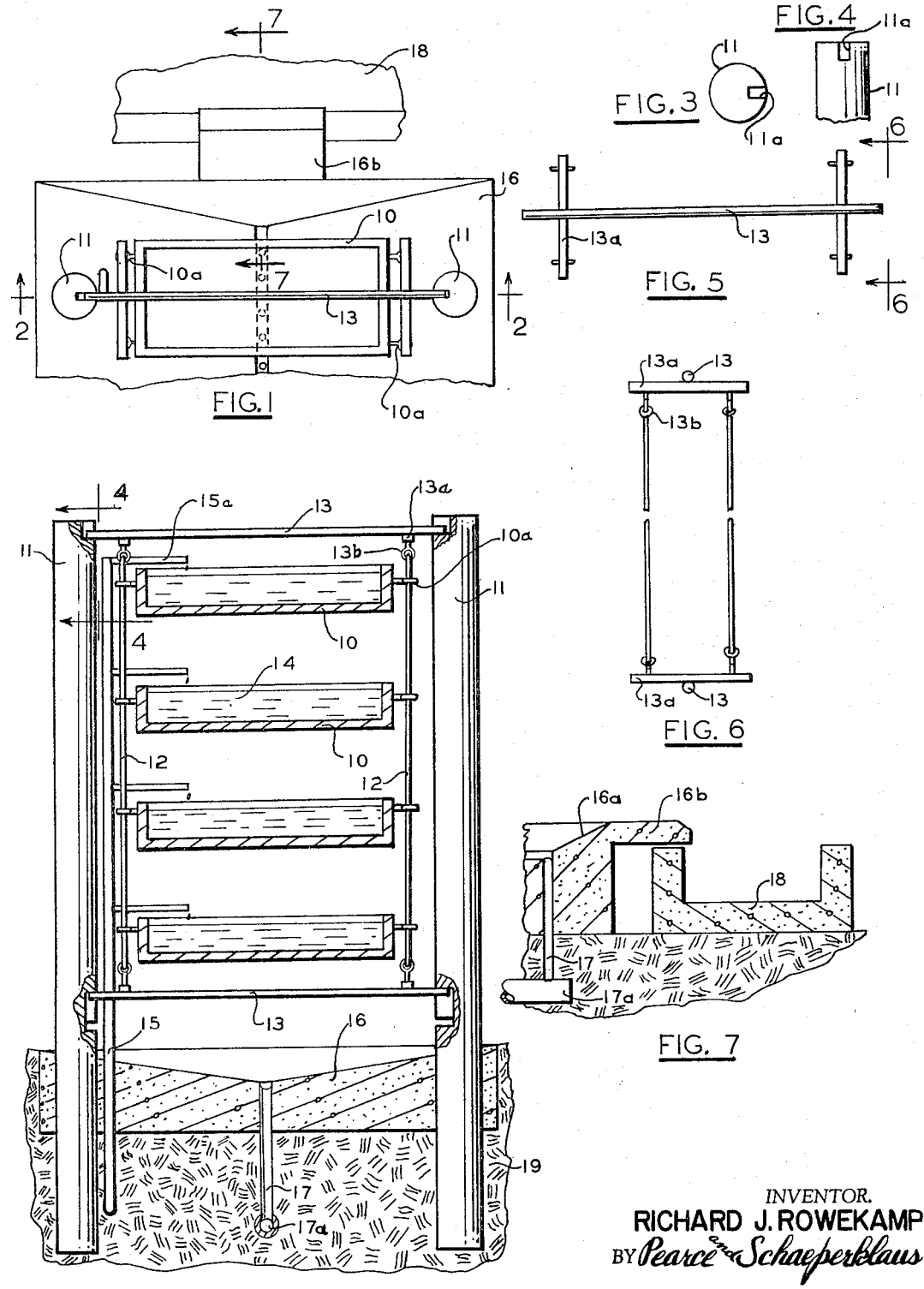
INVENTOR.
RICHARD J. ROWEKAMP
BY Pearce & Schaeperklaus
ATTORNEYS United States Patent Office 3,293,872
Patented Dec. 27, 1966

3,293,872
LADDER-TYPE TRAYS FOR DESALTING
SEA WATER
Richard J. Rowekamp, 440 Hilltop Lane,
Cincinnati, Ohio 45215
Filed Feb. 28, 1966, Ser. No. 530,736
3 Claims. (Cl. 62—123)

This is a continuation-in-part of my co-pending application Serial No. 442,920, filed March 26, 1965, now abandoned. This invention relates to trays for desalting sea water. The object of this invention is to improve the production capacity of the solar trays described in application Serial No. 431,509, filed February 10, 1965, now abandoned which desalt sea water through direct freezing of shallow trays of saline water exposed to the extreme cold air of the atmosphere, and which give their best performance in frigid regions of the world which have long, cold winters.

More particularly, this invention relates to ladder-type solar trays which are hung in the air, one above the other, by means of ropes attached to swivel rods that are anchored in long upright wooden poles. By this arrangement, the production of a desalting area could be multiplied thirty to one hundred times, thus greatly enhancing the potential for producing cheap fresh water from saline water. More specifically, the yield per acre can be increased by hanging thirty to one hundred trays in the air instead of placing one tray near the ground as described in application Serial No. 431,509.

This invention points up another of the advantages which is offered by solar freezing over the solar still-type of desalting as presently employed by the U.S. Government in Florida. The solar still operates off sunlight, while solar freezing operates off the lack of sunlight. Therefore, solar trays for desalting sea water through freezing can be stacked high in the air without fear of blocking the sun rays; while this would be completely impractical with a solar still because sunlight would be blocked out by the upper-most still, and the remaining ones on the bottom could not be heated by sunlight.

The solar still, in fact, has so many disappointing features that its use for desalting sea water may be abandoned in the future. Perhaps the most disappointing feature of the solar still is the fact that it requires one acre of stills to produce enough fresh water to irrigate one acre of farmland. In other words, if one million acres of farmland were to be irrigated, it would require one million acres of solar stills to produce the fresh water. By comparison, the solar freezing method, as outlined herein, might require considerably less than one thousand acres of ladder-type solar trays to produce the required fresh water. This is accounted for as follows: the solar still is lucky to produce 0.10 gal./sq. ft./day of fresh water; meanwhile, a single solar tray, in a good frigid region of the world, is likely to produce 20 gal./sq. ft./day; and the ladder-type arrangement could produce as much as 2000 gal./sq. ft./day.

The phenomena associated with the solar chilling and freezing method of desalting sea water has previously been described in application Serial Nos. 395,092 and 431,509, and will not be discussed again herein.

An object of this invention is to provide a means of suspending a group of shallow corrosion-resistant metal trays, one above the other, in a sort of ladder fashion, so that the top, bottom, and sides of the trays will be be exposed to the cold air of the atmosphere. This is accomplished by placing two long wooden poles deep in the ground in a perpendicular position and so that swivel rods can be inserted in their upper-most and lower-most portions; long ropes, dangling between arms of the swivel rods, are then fastened to rings attached to the shallow trays, thus holding them suspended in the cold air. This arrangement not only exposes all the trays to the cold air of the atmosphere, but it offers a means of moving and tilting them so that the brine solution and ice crystals can be dumped out of them.

Another object of this invention is to provide a means of filling the shallow trays with sea water. This is accomplished by running a long inlet pipe up one of the wooden poles, and off of it extending a number of relatively short flexible hoses. Sea water is then pumped through the long inlet pipe, through the flexible hoses, into the shallow trays.

Still another object of this invention is to provide a means of collecting the ice crystals and separating the brine solution from them. This is accomplished by providing a valley-type concrete apron, at the lowest portion of which are placed small outlet pipes which allow the brine solution to drain through them, while trapping and collecting the ice crystals. By using a valley-type apron, the desalting area can be rather continuous and large, and a great number of wooden poles can be erected which carry a great series of trays for a given area.

The above and other objects and features of this invention will be apparent to those skilled in the art to which this invention pertains from the following detailed description, and the drawing, in which:

FIG. 1 is a schematic plan view showing an arrangement of trays and related components constructed in accordance with an embodiment of this invention;

FIG. 2 is a view in section showing how the trays are hung, one above the other, taken on the line 2—2 in FIG. 1;

FIG. 3 is an enlarged plan view of one of the wooden poles as seen in FIG. 1, showing the location and width of a short slot that is cut into the pole so that swivel rods can be anchored into the poles;

FIG. 4 is a view looking in the direction of the arrows 4—4 in FIG. 2, showing the length and width of the slot that is cut into the wooden poles;

FIG. 5 is a plan view of the swivel rod shown in FIG. 1;

FIG. 6 is a view of the swivel rod taken in the direction of the arrows 6—6 in FIG. 5; and FIG. 7 is a view in section taken on the line 7—7 in FIG. 1 showing a cocncrete gutter and its junction with the valley-type apron, giving details of their construction.

In the following detailed description and the drawing, like reference characters indicate like parts.

In FIGS. 1 and 2 is shown how a group of trays 10 are suspended in the air, one above the other, between two long wooden poles 11 by means of ropes 12 which are attached to swivel rods 13 which are anchored into the poles 11 at the top and bottom, just above the upper-most tray 10, and just below the lowermost tray 10. The trays 10 are comprised of a bottom panel and side walls extending upwardly from the bottom panel; the upper portion is uncovered. To two opposite side walls of trays 10 are welded stud-ring assemblies 10a, which, together with tray 10, have previously been described in application Serial No. 431,509. Hereinafter, the stud-ring assemblies 10a are referred to as ring 10a. Slots 11a (FIGS. 3 and 4) are provided in poles 11 at the appropriate places so that swivel rods 13 can be anchored into the poles 11; slots 11a are large enough, however, so that the swivel rods 13 are free to move or rotate. To swivel rods 13 are welded arms 13a (FIGS. 5 and 6), at the extreme ends of which are welded stud-ring assemblies 13b (hereinafter referred to merely as rings 13b). Rope 12 is then fastened to rings 13b on the swivel rod 13 and to rings 10a on the trays 10, and strung very tightly so that the trays 10 and the swivel rods 13 will move when the rope 12 is pulled up or down. Rope 12 can be pulled either manually or mechanically.

The trays 10 are filled with sea water 14 (FIG. 2) by means of a long inlet pipe 15, which is fastened to one of the poles 11; off long inlet pipe 15 there extend, at appropriate locations, short flexible hoses 15a, which deliver sea water 14 to each of the trays 10. The long inlet pipe 15 is connected to a main inlet header, which in turn is connected to a reservoir containing a large volume of ocean water (not shown in the drawing).

The metal trays 10 are extremely shallow. Their maximum depth is about one-and-a-half inches; and if filled to the top, they would hold about one gallon per square foot of salt water. The trays are so arranged, one on top of the other, so that all are completely surrounded on the top, bottom, and sides by the cold air of the atmosphere.

Ropes 12 hold the trays in a level position while the sea water 14 is being frozen by the cold air of the atmosphere. When the shallow pool of salt water is partially frozen, the trays 10 are hoisted into a slightly slanting position by pulling on the ropes 12; this will cause some of the brine solution to overflow the trays 10 and fall down onto concrete apron 16. Concrete apron 16 is V-shaped, and at its lowest-most portion are placed small outlet pipes 17, which permit the brine solution to drain out of the concrete apron 16. The brine solution is poured gradually out of the trays 10, until finally only ice crystals remain. Rope 12 is then pulled so that the trays 10 slant to a nearly vertical position, thus causing the ice crystals to fall out of the trays 10 and down upon concrete apron 16. The ice crystals are then pushed, either manually or mechanically, off concrete apron 16 into concrete gutter 18, which affords a means of transporting the ice crystals to a suitable storage area.

The concrete apron 16 can be quite long, and several series of ladder-type trays can be built above it. The concrete apron rests directly upon earth 19, and is comprised of a mixture of Portland cement, sand, gravel, and water; it is poured around the wooden poles 11, which are buried several feet deep in earth 19. At the extreme ends of apron 16, there is a raised portion 16a and a concrete chute 16b. The purpose of the raised portion 16a is to prevent some of the brine solution from pouring into the concrete gutter 18. Outlet pipes 17 are connected to a main outlet header 17a, which is connected to a reservoir (not shown in the drawing), from where the brine solution is pumped back into the ocean.

The trays 10 can be formed of any suitable corrosion-resistant metal which possesses the additional qualities of rigidity and hardness; the same would be true of the swivel rods 13, long inlet pipe 15, and rings 10a and 13b. The short flexible hoses can be made of rubber or plastic. Lead alloyed with antimony and tin, or aluminum alloyed with titanium would be a satisfactory metal for making the above parts. Actually, other materials could be used, such as plastics. The apron 16 and the gutter 18 need not necessarily be made of concrete; instead, they could be made of lead or plastics formed in the shape shown in the drawing.

The design of the ladder-type solar trays and related components can be altered without departing from the spirit and scope of the appended claims.

Having described my invention, what I claim as new and desire to secure by Letters Patent is:

1. A group of solar trays for desalting sea water by freezing through exposure to the extreme cold air of the atmosphere, which comprises a number of shallow corrosion-resistant metal trays hung, one above the other, so that each is completely surrounded by the cold air of the atmosphere; said metal comprising said trays being aluminum alloyed with titanium; said trays having a base and walls extending upwardly from said base, and having an upper portion that is uncovered; means for suspending the trays high in the air, one above the other; said suspending means being a combination of long upright poles, swivel rods, and ropes which are fastened one to the other; said suspending means also providing the means for tilting said trays so that they can be emptied of their contents of frozen ice crystals and brine solution; said means for tilting said trays being accomplished by pulling said ropes up or down; means for filling each of said trays with sea water; and means for collecting the ice crystals and draining away the brine solution.

2. A group of solar trays for desalting sea water by freezing through exposure to the extreme cold air of the atmosphere which comprises a group of shallow corrosion-resistant metal trays having a base and walls extending upwardly from said base, the upper portion of said trays being uncovered, means for introducing sea water into the trays through the use of flexible hoses connected to a long inlet pipe which is in close proximity of the trays, means for suspending said trays high in the air which comprises two upright poles which support a system of swivel rods and ropes which are fastened to said trays and said poles, said supporting means also providing the means for tilting said trays so that they can be emptied of their contents of frozen ice crystals and brine solution, said means for tilting said trays being accomplished by pulling said ropes up or down, means for separating the ice crystals from the brine solution through the use of a valley-type apron which has small outlet pipes placed in its lowest portion which drain away the brine solution, and a gutter for receiving the ice crystals from the apron.

3. A group of solar trays for desalting sea water by freezing through exposure to the extreme cold air of the atmosphere, which comprises a number of shallow corrosion-resistant metal trays hung, one above the other so that the top, bottom, and sides are surrounded by the cold air of the atmosphere; said trays being suspended in the air by means of ropes that are fastened to rings attached to two opposite sides of said trays and to arms of swivel rods; said swivel rods being anchored, yet free to rotate, in slots which are provided in two long upright wooden poles; one swivel rod being located at the top of said wooden poles just above the upper-most tray, and the second being located at the bottom just below the lower-most tray; said wooden poles being buried deep in the earth, and running parallel and in close proximity to the side walls of said metal trays; said ropes being stretched tightly between the upper swivel rod and the lower swivel rod and between said rings of said trays so that the trays are held firmly in their suspended position; said ropes and swivel rods also providing a means of tilting said trays so that they can be emptied of their contents of frozen ice crystals and brine solution; said means for tilting said trays being accomplished by moving said ropes up or down; means for introducing sea water into said trays through the use of flexible hoses connected to a long inlet pipe which is anchored to one of the wooden poles; means for separating the ice crystals from the brine solution through the use of a valley-type apron which is provided with small outlet pipes placed in its lowest portion, and a gutter for receiving the ice crystals from the apron.

References Cited by the Examiner

UNITED STATES PATENTS 1,910,920  5/1933  Higgins.

MEYER PERLIN, *Primary Examiner.*

W. E. WAYNER, *Assistant Examiner.*